(12) United States Patent
Stephenson et al.

(10) Patent No.: US 6,202,016 B1
(45) Date of Patent: Mar. 13, 2001

(54) SHIFT ON THE GO TRANSMISSION SYSTEM

(75) Inventors: Dwight B. Stephenson, Delafield; Russell P. Schuchmann, Milwaukee, both of WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/371,686

(22) Filed: Aug. 10, 1999

(51) Int. Cl.⁷ ...................................................... G06F 17/00
(52) U.S. Cl. ............................. 701/51; 701/61; 701/62; 701/64; 475/121; 477/127; 477/144
(58) Field of Search .............................. 701/51, 54, 61, 701/62, 64; 477/124, 125, 127, 144, 148, 52, 61; 475/122, 125, 121

(56) References Cited

U.S. PATENT DOCUMENTS

| | | | |
|---|---|---|---|
| 3,180,080 | 4/1965 | Budzich et al. ........................... 60/19 |
| 4,193,323 | 3/1980 | Bubula et al. ........................... 74/733 |
| 4,282,947 | 8/1981 | Kemper ................................. 180/165 |
| 4,766,779 | 8/1988 | Massy .................................... 74/733 |
| 4,939,954 | 7/1990 | Walzer et al. ........................... 74/733.1 |
| 4,947,687 | 8/1990 | Martini et al. ........................ 74/733.1 |
| 5,505,113 | 4/1996 | Wiest ................................... 74/733.1 |
| 5,601,506 | * | 2/1997 | Long et al. ........................... 475/120 |
| 5,643,125 | * | 7/1997 | Long et al. ........................... 475/127 |
| 5,678,463 | 10/1997 | Brambilla et al. .................. 74/733.1 |
| 5,682,315 | 10/1997 | Coutant et al. ............... 364/424.086 |
| 5,685,799 | * | 11/1997 | Vukovich et al. ..................... 477/61 |

* cited by examiner

Primary Examiner—William A. Cuchlinski, Jr.
Assistant Examiner—Yonel Beaulieu
(74) Attorney, Agent, or Firm—L. J. Kasper

(57) ABSTRACT

A method of shifting a transmission having both a hydrostatic portion, including a variable pump (15), and a hydraulic motor (29), and a mechanical transmission (33) portion, including a shift cylinder (37). The method includes relieving the output torque of the motor (29), shifting the mechanical transmission to neutral, and controlling the displacement of the pump (15) to synchronize motor output speed with the required input speed to the desired gear ratio of the mechanical transmission (33). Then fluid flow to the shift cylinder (37) occurs to shift to the desired gear ratio. The shifting method includes a series of steps in which the feasibility of the prospective shift is determined, and only when the prospective shift can be completed, without detriment to the operation of the vehicle, will the shift be completed. As a result, the shifting between low gear and high gear can occur without bringing the vehicle to a stop each time.

12 Claims, 10 Drawing Sheets

SHIFT ON THE GO TRANSMISSION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to a transmission for use on a vehicle of the primarily off-highway type, and more particularly, to such a transmission which includes both a hydrostatic transmission portion and a mechanical transmission portion.

The present invention could be used on a variety of vehicle types, including vehicles which travel, at least part of the time, as "on-highway" vehicles, but it is especially adapted for use in "off-highway" vehicles and will be described in connection therewith.

It has been generally well known to those skilled in the art to provide a transmission including a hydrostatic transmission portion and a mechanical transmission portion. A typical hydrostatic transmission comprises a variable-displacement pump hydraulically coupled to a motor (typically, of fixed displacement), and appropriate controls for varying the displacement of the pump. Although various types of pumps and motors can be utilized, it is preferable to use an axial piston pump and motor, wherein displacement of the pump is varied by changing the tilt angle of a tiltable swashplate, in a manner which is very well known to those skilled in the art.

The "mechanical transmission" may comprise a simple two-speed, shiftable, gear-type transmission, which effectively serves as a "range" selector for the hydrostatic transmission, to extend the speed range and gradability of the vehicle, while permitting the components of the hydrostatic transmission to be of a reasonable, and more economical size. Those skilled in the art will understand that the invention is not limited to use with a two-speed transmission, and a three-speed or perhaps even a four-speed transmission could be used, but for ease of illustration and explanation, the invention will be described in connection with a two-speed transmission.

Although various means of shifting the mechanical transmission may be provided, and the invention is not limited to any particular such means, the invention will be described in connection with a mechanical transmission which is provided with a shift cylinder having a neutral position, in which the mechanical transmission is disengaged and then, preferably on either side of neutral, a pair of positions corresponding to low gear and high gear.

In describing the system of the present invention, in order to avoid the confusion usually associated with references to "low" gear and "high" gear, the two gears in the mechanical transmission will be referred to simply as "first gear" (or Gear 1) and "second gear" (or Gear 2). In general, Gear 1 and Gear 2 may be thought of as corresponding to a first gear and a second gear in an automotive type transmission, wherein the ratio of engine speed to drive shaft speed is greater in first gear than in second gear, or stated another way, for a constant engine speed, vehicle speed will increase upon shifting from first gear to second gear. However, those skilled in the art will understand that references hereinafter to low and high gears, or Gear 1 and Gear 2, are by way of example and explanation, and not by way of limitation, except where the context clearly indicates otherwise, and references in the appended claims to first and second gear ratios are similarly not meant to be limiting. In other words, a reference in the appended claims to a "first gear ratio" can mean either the low gear or the high gear, and the term "first" is used simply to indicate that it is the first reference to a gear ratio.

Although a transmission of the type described, including both a hydrostatic portion and a mechanical portion, has been generally satisfactory in achieving the overall objectives noted above, one major disadvantage which has been present in the prior art transmissions has been the necessity to stop the vehicle in order to change the gear ratio (or "range") of the mechanical transmission. The necessity to stop the vehicle obviously results in greater operator effort and fatigue, but also decreases the amount of useful work which can be accomplished with the vehicle. Furthermore, if the vehicle is stopped on a grade (either uphill or downhill), such that the mechanical transmission has torque applied to it, the vehicle operator may have great difficulty performing the desired gear shift, or range selection, of the mechanical transmission.

Accordingly, it is an object of the present invention to provide an improved transmission including both a hydrostatic transmission portion and a mechanical transmission portion in which the shifting of the mechanical transmission may be performed "on the go," i.e., without stopping the vehicle, and preferably, with no immediate, discernible change of vehicle speed.

In order to accomplish the above-stated object, it is desirable to provide a hydrostatic transmission which is electronically controlled, i.e., one in which there is overall electronic control of the transmission, whereby displacement of the hydrostatic pump is coordinated with the shifting of the mechanical transmission to achieve the shift-on-the-go capability.

Unfortunately, simply combining an electronically controlled hydrostatic transmission and mechanical transmission, and coordinating the shifting of the two transmissions electronically, would frequently have the result that the shifting of the mechanical transmission would occur under conditions where such a shift is not desirable (or "feasible"). By way of example only, if the vehicle were loaded to such an extent that the vehicle would come to a stop during the shift operation, then the shift operation, under those particular conditions, would not be considered "feasible", and should not be allowed by the control system.

Accordingly, it is another object of the present invention to provide a transmission and control system of the type described above, which has the shift-on-the-go capability, but wherein the control system does not permit the occurrence of any shift which is not considered feasible, as that term will be described further hereinafter.

One important aspect of the type of system described above is to determine that a particular shift is feasible, and then complete the shift as quickly as possible (i.e., before the shift in question becomes "not feasible"). For example, in the condition described above, if there is concern about the loading on the vehicle bringing it to a stop before the shift is completed, then clearly, the quicker the shift is performed, the greater will be the chance of that particular shift being considered feasible, and being successfully performed. As those skilled in the art understand, the more quickly the shift can be completed, the greater the number of vehicles and applications which can utilize the transmission system of the present invention.

Accordingly, it is another object of the present invention to provide a transmission and control system having the ability to minimize the time required to achieve the various shifting operations by utilizing predictive control logic.

BRIEF SUMMARY OF THE INVENTION

The above and other objects of the invention are accomplished by the provision of an improved method of shifting a transmission of a vehicle including a source of motive power and at least one drive wheel. The transmission is adapted to receive input torque from the source of motive power and to transmit output torque to the drive wheel. The transmission includes a variable-displacement hydraulic pump, a fluid-pressure-actuated means for varying the displacement of the pump, and a hydraulic motor hydraulically coupled to the pump. The transmission further includes a mechanical transmission having a first gear ratio and a second gear ratio, and fluid-pressure-actuated means for shifting the mechanical transmission from a neutral condition to one of the first and second gear ratios.

The improved method is characterized by the steps of relieving the output torque transmitted by the hydraulic motor when the mechanical transmission is in the first ratio, and shifting the mechanical transmission from the first ratio to the neutral condition. The method includes controlling the fluid pressure at the fluid-actuated means for varying the displacement of the pump, whereby the output speed of the hydraulic motor is synchronized with the instantaneous input speed required for the mechanical transmission to operate in the second gear ratio. Finally, the method comprises controlling the fluid pressure at the fluid-pressure-actuated means for shifting the mechanical transmission whereby the transmission is shifted into the second gear ratio.

DETAILED DESCRIPTION OF THE PREFERRED EMBODIMENT

Figure 1:
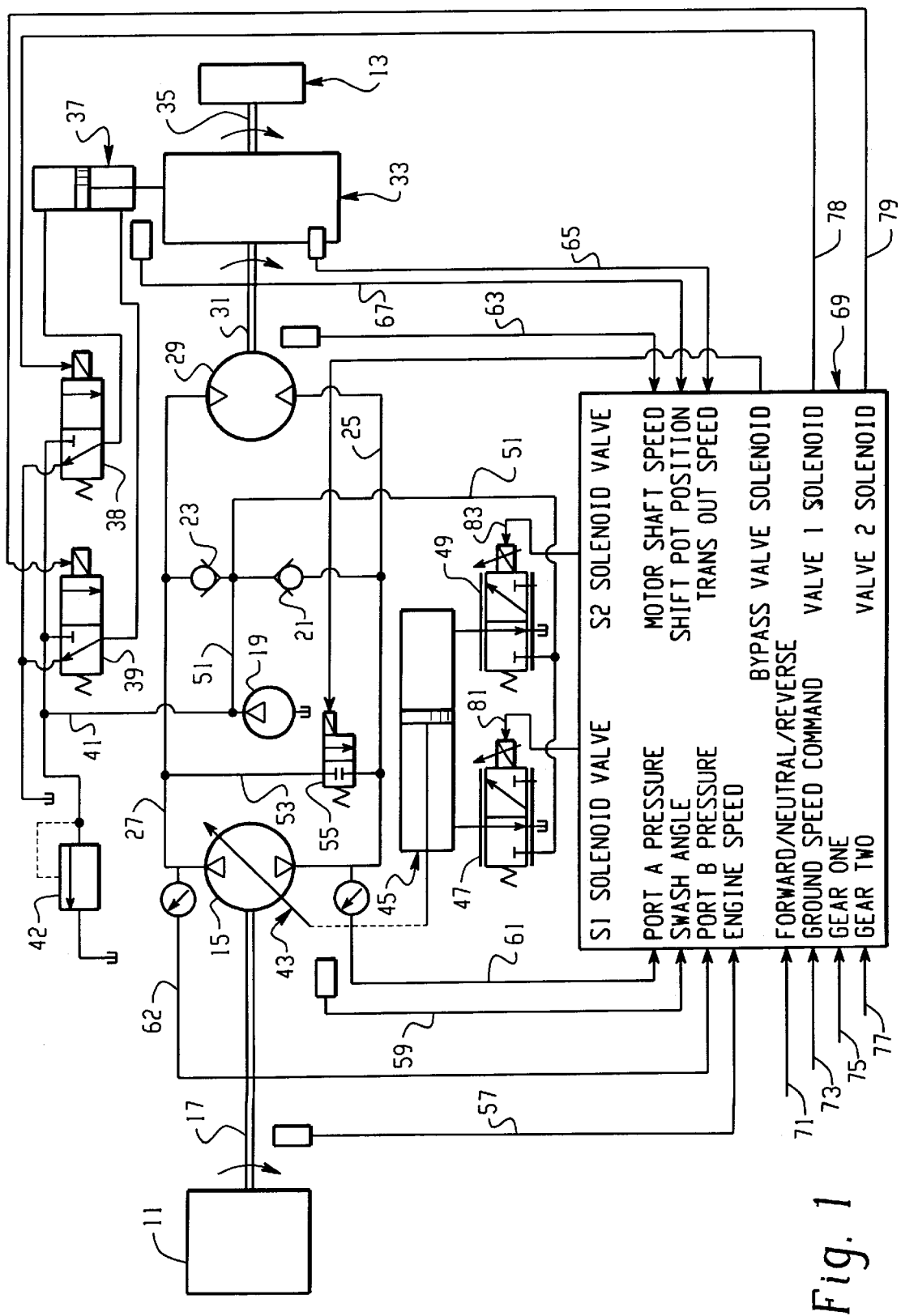
FIG. 1 is a schematic of the transmission and the control system of the present invention.

Referring now to the drawings, which are not intended to limit the invention, FIG. 1 illustrates a vehicle drive system made in accordance with the teachings of the present invention. The vehicle drive system includes a prime mover 11, which typically comprises the vehicle engine, and a set of drive wheels 13, represented only schematically herein.

Input torque is transmitted from the prime mover 11 to the hydrostatic transmission portion of the system, and specifically, to a variable-displacement pump 15, by means of an input shaft 17. Typically, a charge pump 19 is also driven off the input shaft 17, or some sort of extension thereof. As is well known to those skilled in the art, one function of the charge pump 19 is to provide makeup fluid to whichever side of the hydrostatic circuit is at low pressure, which is accomplished, schematically, through a pair of check valves 21 and 23. The pump 15 is hydraulically coupled, by a pair of conduits 25 and 27, to a hydrostatic motor 29, illustrated herein as being a fixed displacement motor.

The output of the motor 29 is transmitted by means of an output shaft 31 to a two-speed mechanical transmission 33 which, in turn, has a drive shaft 35 suitable to propel the drive wheels 13. Typically, there would be a final drive gear ratio (not shown herein) between the transmission 33 and the drive wheels 13. The mechanical transmission 33 has its gear ratio determined by a shift cylinder 37, illustrated herein as being in its neutral position. Control of the shift cylinder 37 is accomplished by means of a pair of shift valves 38 and 39, each of which receives pressurized control fluid from the charge pump 19, or from some other suitable source, by means of a conduit 41. Also connected to the conduit 41 is a conventional charge pressure relief valve 42.

The displacement of the variable pump 15, i.e., the fluid output per revolution of the input shaft 17, is determined by the position of a swashplate 43, as is well known to those skilled in the art. The position of the swashplate 43 is controlled by a servo-assembly (piston and cylinder), generally designated 45. The position of the servo-assembly 45 is controlled by means of a pair of servo-control valves 47 and 49, each of which receives pressurized control fluid from the charge pump 19 by means of a conduit 51. Connected between the main system conduits 25 and 27 is a conduit 53, and disposed in series in the conduit 53 is a bypass valve 55, the function of which will be described subsequently.

As one important aspect of the control system of the present invention, it is necessary to have a number of sensors, which will now be described briefly, and in each case, the reference numeral is associated with the signal from the sensor, because most subsequent references will be to the signal, rather than to the sensor itself. Associated with the input shaft 17 is a speed sensor providing an engine speed signal 57. Associated with the swashplate 43 is a swash angle sensor (typically, a rotary potentiometer) which provides a swash angle (pump displacement) signal 59. The pump 15 includes a pair of sensors, typically associated with the inlet and outlet ports thereof, which provide pressure signals 61 and 62, representative of the pressures in the conduits 25 and 27, respectively. Associated with the motor output shaft 31 is a speed sensor which provides a motor speed signal 63, which is also indicative of the input speed to the mechanical transmission 33.

The mechanical transmission 33 includes a speed sensor which provides a transmission output speed signal 65, while the shift cylinder 37 has associated therewith a position sensor (typically, a linear potentiometer) which provides a shift cylinder position signal 67. Alternatively, in view of the fact that the cylinder position signal 67 merely has to indicate neutral, or first gear, or second gear (as opposed to actual linear position), it would be satisfactory to utilize position sensing switches, rather than a linear potentiometer.

The various signals 57–67 described above are among the system inputs to an electronic control unit (ECU) generally designated 69. The ECU 69, which is of a general type well known to those skilled in the art, must be capable of accepting both analog and digital inputs, as well as frequency inputs. The other inputs to the ECU 69 are signals from the operator's console (not shown herein) and include a Forward/Neutral/Reverse switch, manually operable by the operator, which provides an F/N/R signal 71, the signal 71 simply providing an indication of the general condition selected by the operator for the pump 15, i.e., whether the swashplate 43 is stroked to propel the vehicle in a forward direction, or whether the swashplate 43 is destroked (neutral), or whether the swashplate 43 is stroked in the opposite direction to propel the vehicle in reverse. The vehicle operator also has a ground speed selector which provides a ground speed command signal 73, which will be generally indicative of the displacement of the swashplate 43, assuming the operator has selected either forward or reverse. Finally, the operator has a gear selector switch, such that, if the F/N/R signal 71 is not in neutral, either a Gear 1 signal 75 or a Gear 2 signal 77 will be transmitted to the ECU 69.

Another requirement for the ECU 69 is that it include driver circuits, operable to provide appropriate signals to solenoid coils of the shift valves 38 and 39 and to solenoid coils of the servo-control valves 47 and 49. Thus, the ECU 69 provides a solenoid driver signal 78 to the shift valve 38, and a solenoid driver signal 79 to the shift valve 39. In addition, the ECU 69 provides a solenoid driver signal 81 to the servo-control valve 47, and a solenoid driver signal 83 to the servo-control valve 49.

Logic

Figure 2:
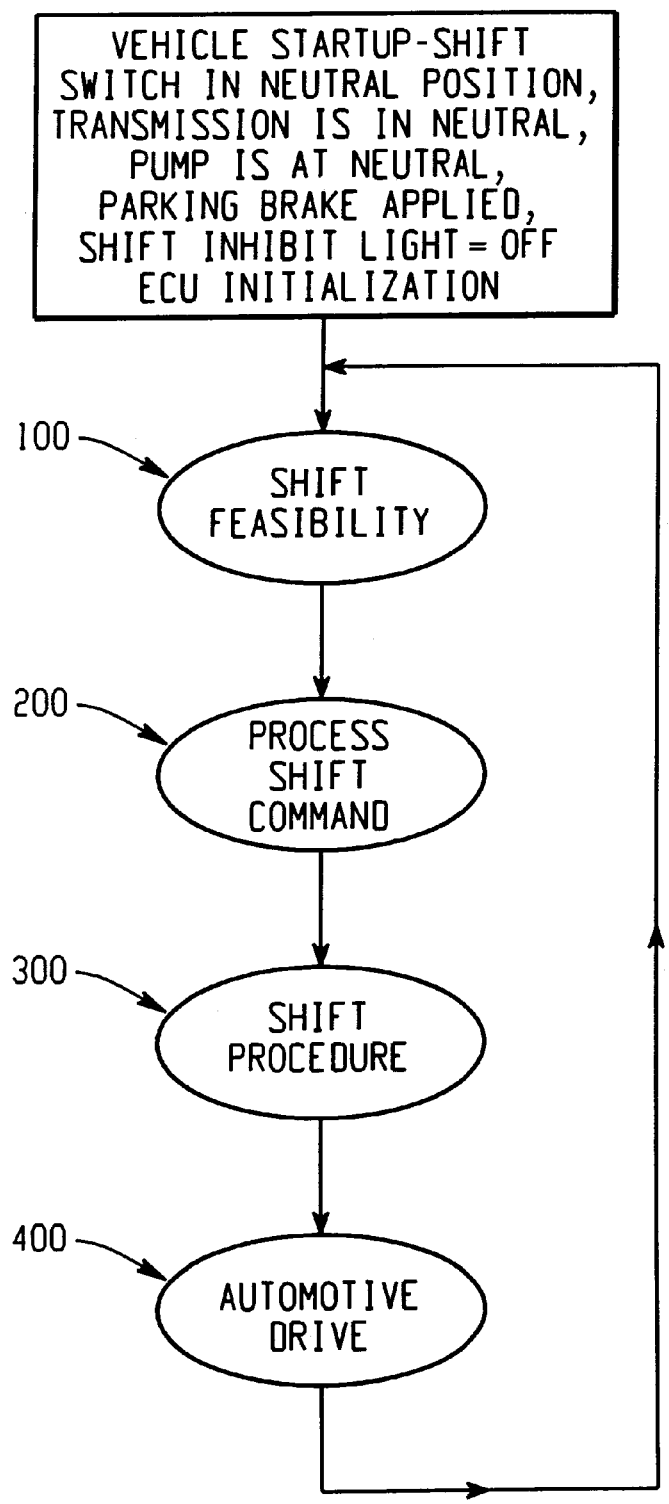
FIG. 2 is a logic diagram broadly summarizing the overall system logic.

Referring now primarily to FIG. 2, there is provided a logic diagram of the overall system logic in accordance with the present invention. By way of preview and summary, the transmission and shift system of the present invention includes shift feasibility logic, generally designated 100, wherein all of the various inputs to the ECU 69 are analyzed and the logic determines whether or not the prospective shift is "feasible", i.e., whether or not the shift can be successfully completed without detriment to the continued operation of the vehicle. For example, if the system pressure (i.e., in one of the conduits 25 or 27) of the hydrostatic transmission after the prospective shift would have to exceed the relief setting of the system relief valves (which are conventional and not shown herein) then the shift is not considered feasible. If the logic determines that the prospective shift is not feasible, then typically, the prospective shift remains in a "pending" status until such time as it is manually cancelled by returning the gear selector switch to its original position, or the conditions change so that the shift becomes feasible.

When the feasibility of the prospective shift has been determined, the system proceeds to logic which processes the shift command, such logic being generally designated 200. The purpose of this logic is primarily to analyze the instantaneous shift command, and based upon that analysis, determine whether or not it is necessary to move the shift cylinder 37 to change the gear ratio of the mechanical transmission 33. If such a shift of the shift cylinder 37 is required, the system then goes to shift procedure logic, generally designated 300, whereas, if the mechanical transmission 33 does not need to be shifted, the system goes directly to the automotive drive logic, generally designated 400.

The shift procedure logic 300 includes a logic portion relating to shifting to or from neutral, deals with the various situations which arise in that event, and also includes a logic portion relating to a shift between low gear and high gear ratios, in which case, it is necessary to pass through neutral.

After either of the above logic portions of the shift procedure logic 300 is completed, the system proceeds to the automotive drive logic 400 which deals with the subsequent control of vehicle speed by means of operator control of pump displacement.

Figure 3:
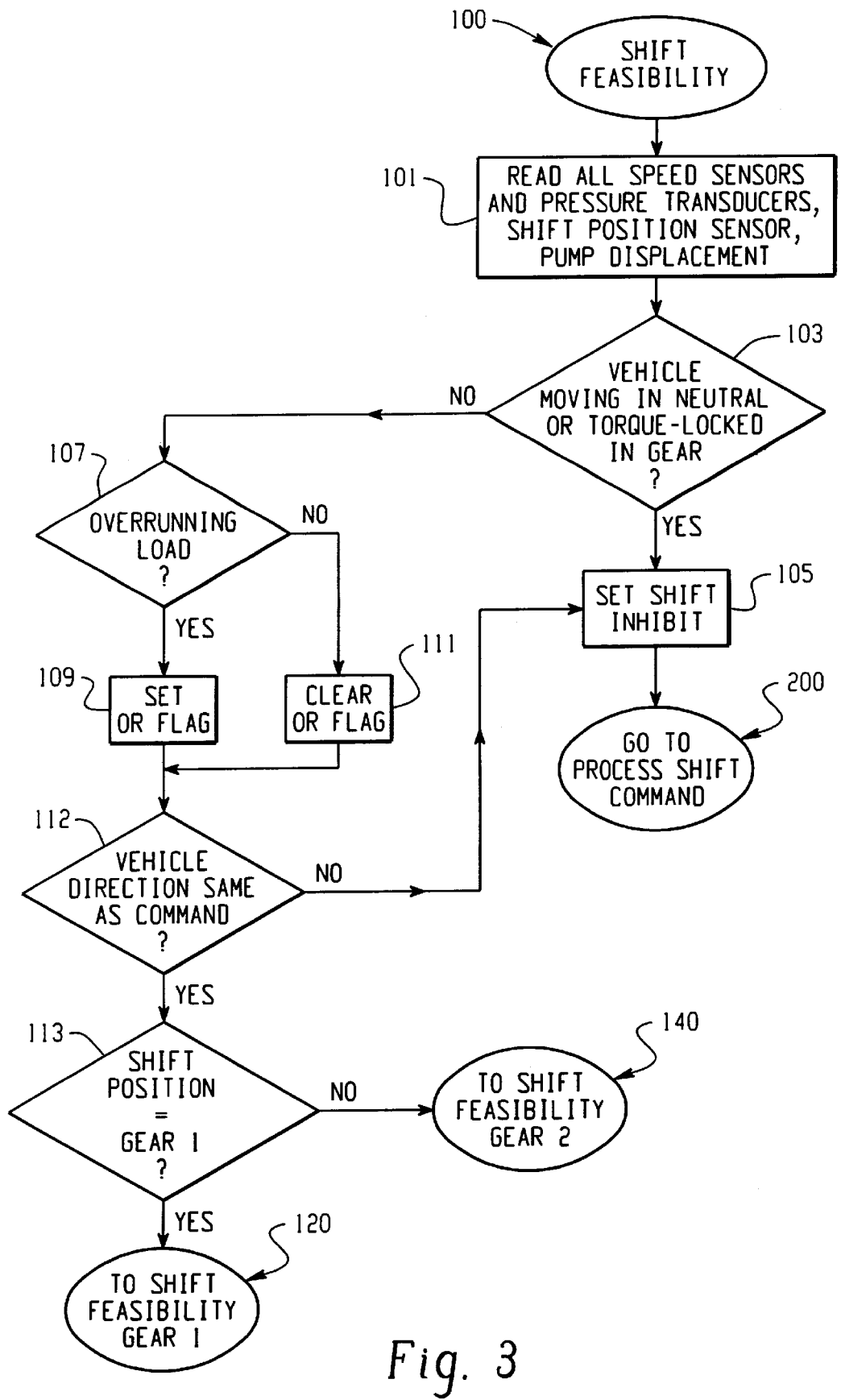
FIGS. 3–9 are logic diagrams illustrating the control logic of the present invention in greater detail.

Referring now primarily to FIG. 3, in the shift feasibility logic 100, the logic first goes to an operation block 101 in which the ECU 69 reads all of the various input signals described above, and shown in FIG. 1 as signals 57 through 77. In addition, the logic clears, or sets negative, the shift inhibit signal, indicating that there is not yet a reason to inhibit, or prevent, the selected shift. The logic then proceeds to a decision block 103 which determines whether the vehicle is moving in neutral (i.e., signal 67 indicates "neutral" while the signal 65 indicates a positive transmission output speed). The decision block 103 also determines whether or not the transmission is torque-locked in gear (signal 67 is not in a neutral condition, and one of the pressure signals 61 or 62 indicates system torque above a predetermined level). If either of the conditions in the decision block 103 is "YES", the logic proceeds to an operation block 105 which sets a "shift inhibit" signal in a positive condition, for subsequent use by the logic, i.e., the shift inhibit signal in a positive condition tells the logic not to attempt the particular shift which has been selected. In the subject embodiment of the system, if the signal 65 indicates that the output speed of the transmission 33 is equal to or less than 10 RPM, the logic will set the signal 65 equal to zero RPM. The system then proceeds to the process shift command logic 200.

If the answer to the decision block 103 is "NO", the system proceeds to a decision block 107 which determines whether or not the vehicle is in an overrunning load situation. It is essential to determine the existence of an overrunning load in view of the fact that the speed of the motor 29 must react to changes in the speed of the vehicle during a shift operation. If the speed of the vehicle or motor changes excessively during the shift operation, the pump 15 may reach the limit of its swashplate displacement before the speed of the motor 29 can be synchronized to the required input speed to the transmission 33. Therefore, the logic considers the pressure signals 61 and 62, and if they are opposite in sign to that required to propel the vehicle, there is an overrunning load, in which case ("YES") the logic proceeds to an operation block 109 in which an overrunning load flag is set in a positive condition, for subsequent use by the logic. If the decision block 107 determines that there is no overrunning load ("NO") the logic proceeds to an operation block 111 in which the overrunning load flag is cleared.

In either case, the logic then proceeds to a decision block 112 which determines whether the actual direction of the vehicle is the same as commanded, i.e., whether the actual vehicle direction matches the F/N/R signal 71. If the result of the decision block 112 is negative ("No"), the logic proceeds to the operation block 105 which sets the "shift inhibit" signal in a positive condition, as was explained previously. If the outcome of the decision block 112 is "Yes", the logic then proceeds to a decision block 113 which determines whether the shift cylinder 37 is in the Gear 1 position, and if so ("YES") the system proceeds to the shift feasibility Gear 1 logic, generally designated 120 (see FIG. 4), which determines whether or not it is feasible to shift from Gear 1 to Gear 2. If the outcome of the decision block 113 is "NO", indicating that the transmission is currently in Gear 2 (signal 67 is within the voltage range indicating that the transmission 33 is in Gear 2), the logic proceeds to shift feasibility Gear 2 logic, generally designated 140 (see FIG.

5), which determines whether or not it is feasible to shift from Gear 2 to Gear 1.

Figure 4:
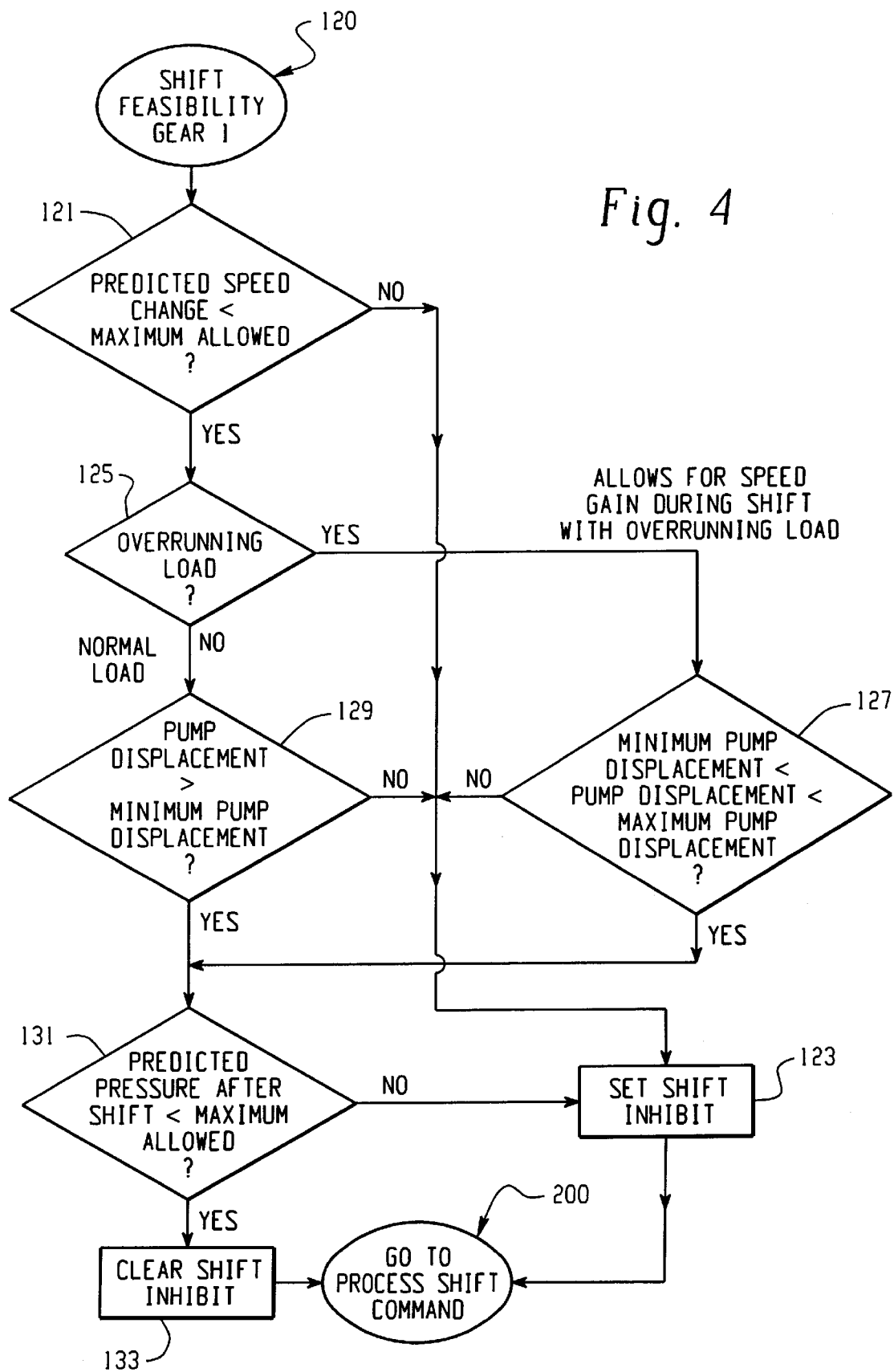

Referring now primarily to FIG. 4, the shift feasibility Gear 1 logic will be described, the general purpose of the logic being to determine whether or not it is feasible to shift to Gear 2. The system proceeds to a decision block 121 which determines whether or not a predicted speed change of the output shaft 31 is less than a predetermined, allowable maximum. The torque required to move the vehicle can be measured by calculating the differential pressure across the conduits 25 and 27, as represented by the difference between the pressure signal 61 and 62. Acceleration of the vehicle is determined by observing the rate of change of the output speed signal 65. Assuming that the mass of the vehicle is programmed into the ECU 69, torque due to acceleration can be calculated and removed from the total torque, leaving "load" torque. From load torque, the acceleration (in the case of an overrunning load), or the deceleration (during the relieving of torque) can be calculated, and an estimate made of the speed gain or loss (as a function of time) which will occur, to determine if the prospective shift is feasible. By way of example only, in the subject embodiment, if there is a speed change of more than 100% predicted to occur within one second, the shift is considered not to be feasible.

If the outcome of the decision block 121 is "NO", indicating that the shift to Gear 2 should not be permitted, the system proceeds to an operation block 123 in which the shift inhibit signal is set positive. If the outcome of the decision block 121 is "YES", indicating that the proposed shift may proceed, the logic then goes to a decision block 125 which again considers whether or not there is an overrunning load, simply by checking the overrunning load flag, to see if it is in a positive condition. If there is an overrunning load ("YES"), the system proceeds to a decision block 127 in which it is determined whether or not the pump displacement is greater than a predetermined "minimum" displacement of the pump but less than a predetermined maximum displacement of the pump. The predetermined minimum displacement of the pump is not zero, but some defined percentage (such as 60%) of maximum displacement. The particular minimum displacement is chosen because a shift to Gear 2 doesn't make sense (is not "feasible") when the vehicle speed available in Gear 1 has not yet been fully exploited. The predetermined maximum displacement of the pump is chosen so the pump is able, temporarily, to increase displacement in case of an overrunning load, in order to help release the torque. If the outcome of the decision block 127 is "NO", indicating that the shift should not be permitted, the system proceeds to the operation block 123, in which the shift inhibit is set positive. If the outcome of the decision block 127 is "YES", indicating that the shift may proceed, the logic rejoins the main path, to be described subsequently.

If the outcome of the decision block 125 was "NO", indicating that the vehicle is operating in a normal propel mode, the logic proceeds to a decision block 129 which merely determines whether or not the pump displacement is greater than the predetermined minimum pump displacement. If the outcome of the decision block 129 is "NO", the system proceeds to the operation block 123 as described previously, but if the outcome is "YES" (or if the output of the decision block 127 is "YES"), the logic then proceeds to a decision block 131 which determines whether the predicted pressure (in the conduit 25 or 27) after the shift would be less than the maximum allowable pressure (i.e., the high pressure relief setting). In order to achieve a smooth shift, the torque at the drive shaft 35 after the proposed shift to Gear 2 must be approximately the same as before the shift. Because the torque at the motor 29 is proportional to pressure, the pressure after the shift would differ by a factor which is the inverse of the gear ratio change. Therefore, the logic, knowing the inverse of gear ratio 2 to gear ratio 1 can calculate the predicted pressure after the shift.

If the outcome of the decision block 131 is "NO", indicating that the pressure after the shift to Gear 2 would exceed the maximum allowable pressure, the logic proceeds to the operation block 123 which was described previously. If the outcome of the decision block 131 is "YES", indicating that the shift may proceed, the system proceeds to an operation block 133 in which the shift inhibit signal is cleared or set to negative. It should be noted in connection with this portion of the logic that, if the shift inhibit signal had previously been set positive, the logic would have already proceeded to the shift command logic, bypassing this portion of the logic. The system then proceeds to the shift command logic 200.

Figure 5:
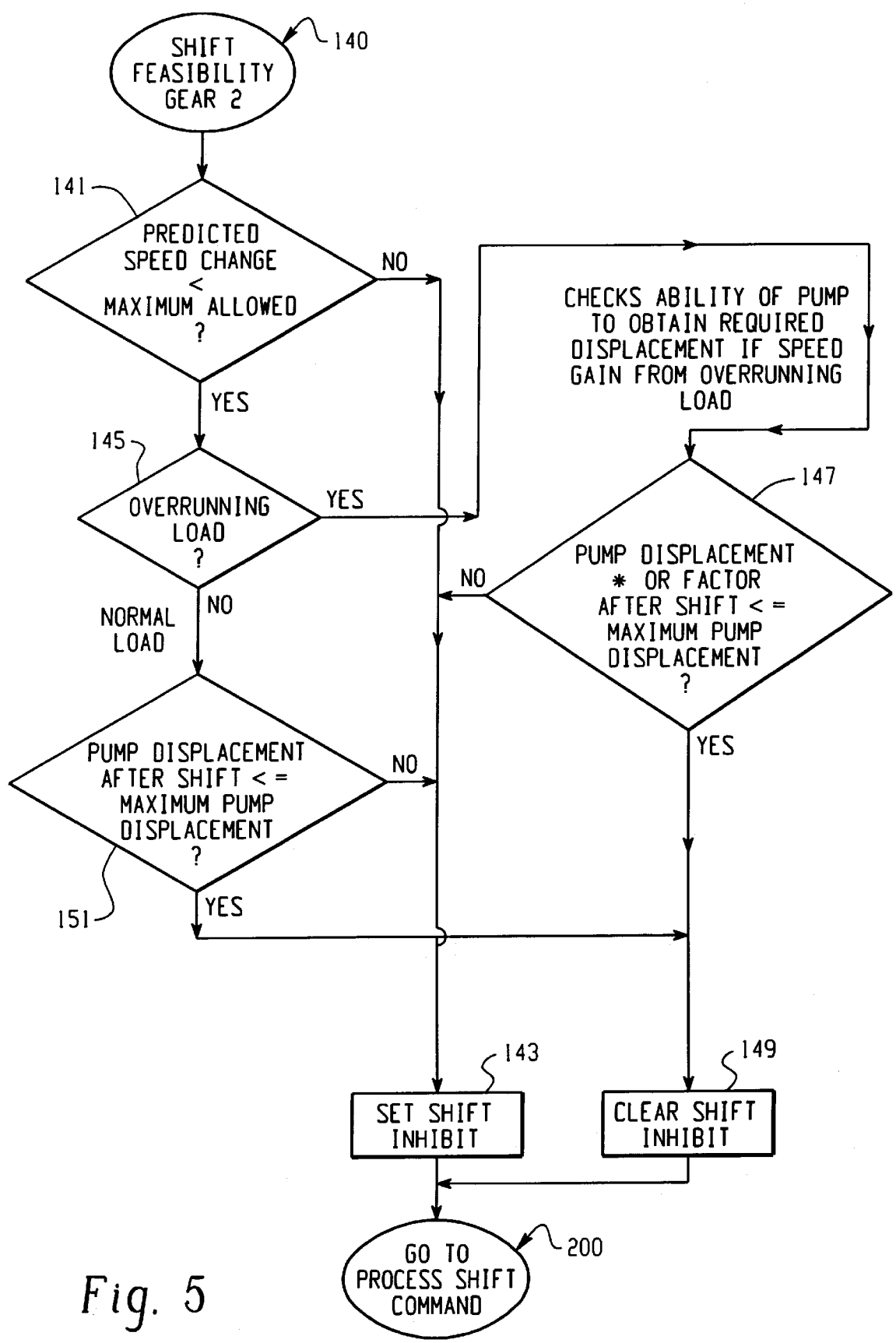

Referring now to FIG. 5, if the transmission is currently in Gear 2 (signal 67 is within a voltage band indicating that the transmission 33 is in Gear 2), the shift feasibility Gear 2 logic 140 determines whether or not a proposed shift to Gear 1 is feasible. The system proceeds to a decision block 141 which, like decision block 121 in FIG. 4, determines whether or not the predicted speed change is less than the predetermined allowable maximum. If not ("NO"), the system proceeds to an operation block 143 in which the shift inhibit is set positive. If the outcome of the decision block 141 is "YES", the system proceeds to a decision block 145 which interrogates the overrunning load flag. If there is an overrunning load condition ("YES"), the system proceeds to a decision block 147 which determines whether the pump displacement multiplied by an overrun factor, after the shift, will be equal to or less than the maximum pump displacement. If the outcome of the decision block 147 is "NO", the system proceeds to the operation block 143, but if the outcome is "YES", indicating that the proposed shift is feasible, the system proceeds to an operation block 149 in which the shift inhibit is cleared.

If the outcome of the decision block 145 is "NO", the logic proceeds to a decision block 151 which determines whether or not the pump displacement, after the shift, will be equal to or less than the maximum pump displacement. If the outcome of the decision block 151 is "NO", the logic proceeds to the operation block 143, but if the outcome is "YES", the logic proceeds to the operation block 149. After either of the operation blocks 143 or 149, the logic proceeds to the process shift command logic 200.

Figure 6:
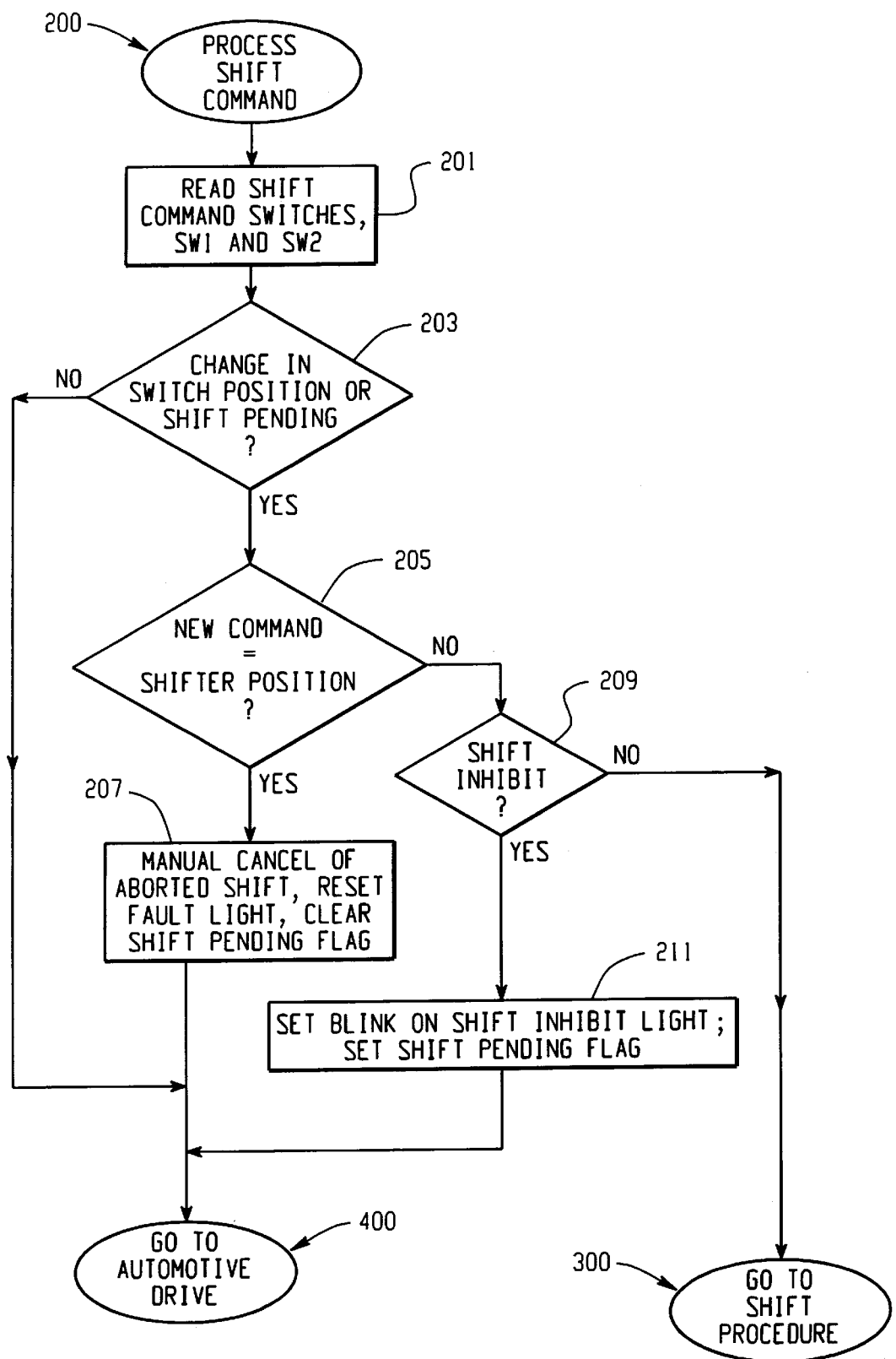

Referring now to FIG. 6, the purpose of the logic 200 shown therein is to process (or analyze) the shift command. The logic proceeds to an operation block 201 in which the shift command switches are read, i.e., the logic reads the signals 71, 75 and 77. The logic then proceeds to a decision block 203 which determines whether or not the shift command switch has changed positions, or if a shift is "pending", i.e., a shift has been commanded which is not currently feasible. Once a shift has been commanded, it remains "pending" until the associated feasibility conditions are satisfied. If the outcome of the decision block 203 is "NO", the logic effectively proceeds to the automotive drive logic 400. If the outcome of the decision block 203 is "YES", the system then proceeds to a decision block 205 which determines whether or not the shift command, read in operation block 201, is equal to the current shifter position, as determined by the signal 67. If so ("YES"), the logic is indicating that the command has changed from the previous command, but that the shifter position is the same as the new command. This could be the result of a pending shift not being completed, or a failed shift, in which case, the new command effectively cancels the pending shift or restores the parity (equality) between the command and the shifter position after a failed shift. The system then proceeds to an operation block 207, which results in a cancellation of an aborted shift, resetting of the fault light, and clearing the shift pending flag. If the outcome of the decision block 205 is "NO", the system proceeds to a decision block 209 which determines whether or not the shift inhibit has been set positive. If the outcome is "YES", the system proceeds to an operation block 211 which results in some sort of signal being sent to the vehicle operator, such as by setting the shift inhibit light in a blinking condition, and also sets the shift pending flag in a positive condition. After the operation block 211, the logic proceeds to the automotive drive logic 400. If the outcome of the decision block 209 is "NO", the system then proceeds to the shift procedure logic 300.

Figure 7:
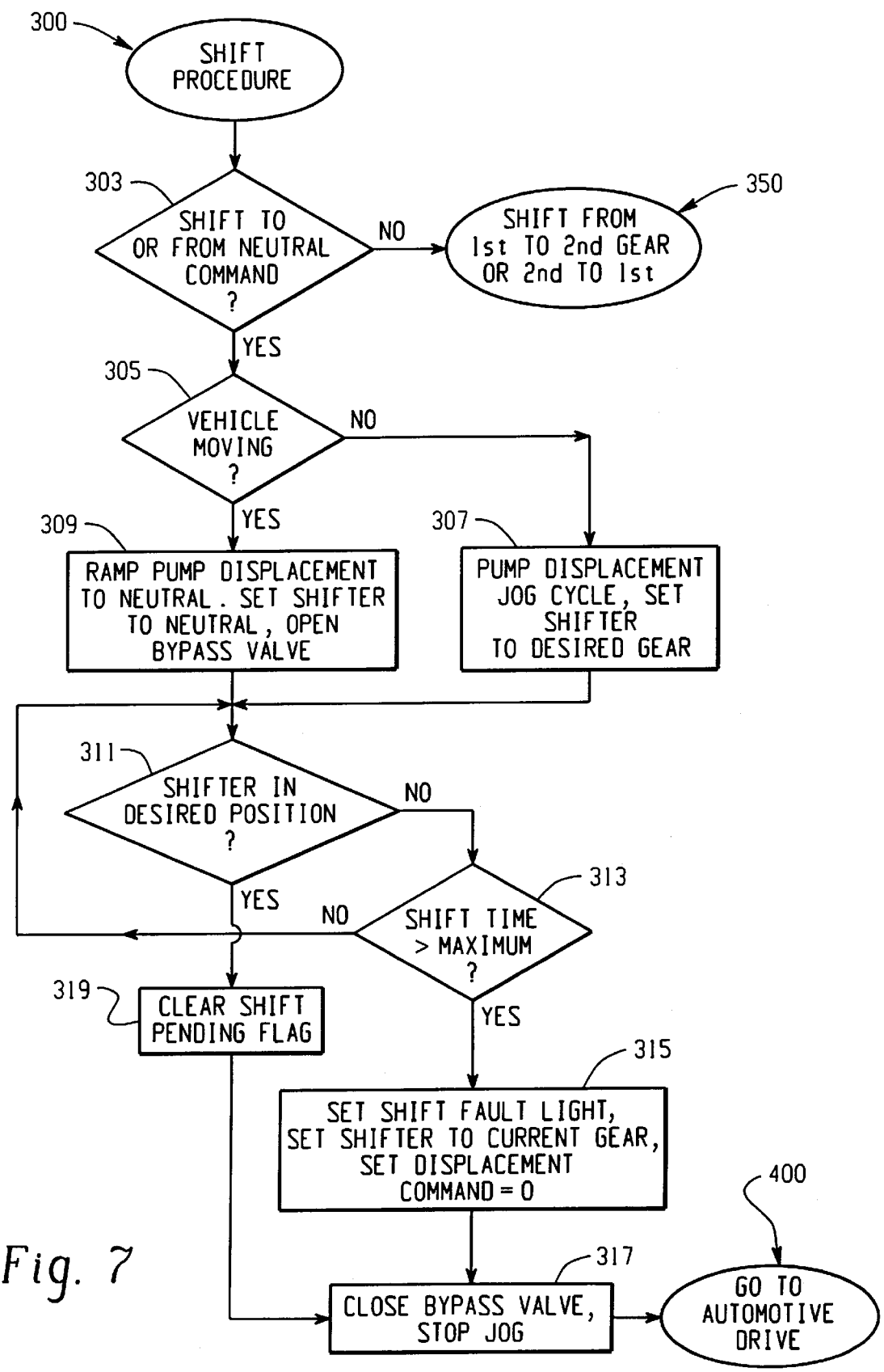

Referring now primarily to FIG. 7, there is a description of the shift procedure logic 300, which deals with shifting to or from neutral and shifting between low gear and high gear, in either case passing through neutral. The logic 300 starts with a decision block 303 which determines whether a shift to or from neutral is being commanded, in other words, whether or not what is being commanded is a conventional shifting operation between first gear and second gear. If the outcome of the decision block 303 is "NO", the system proceeds directly to the shift logic 350, to be described subsequently. If the outcome of the decision block 303 is "YES", the system proceeds to a decision block 305 which determines, by looking at the speed signal 65, whether or not the vehicle is moving. If not ("NO"), the system proceeds to an operation block 307 which initiates a pump displacement jog cycle, and sets the shift cylinder 37 to the desired gear (first gear or second gear or neutral) by transmitting appropriate signals 78 and 79 to the shift valves 38 and 39, respectively.

As part of the operation block 307, the pump displacement jog cycle involves actuating the servo assembly 45 in such a way that the pump swashplate 43 is alternately displaced positively, and then displaced negatively, such that the output shaft 31 is rotated in first one direction and then in the other, enough to permit appropriate gear engagement within the transmission 33. This jog cycle will continue until the shift cylinder 37 is in the desired position, as will be described further below.

If the outcome of the decision block 305 is "YES", indicating that the vehicle is moving, the system proceeds to an operation block 309 in which the logic will provide appropriate drive signals 81 and 83 to the servo control valves 47 and 49, respectively, to change the displacement of the pump swashplate 43 to its neutral position. In accordance with one aspect of the invention, changes in pump displacement are not allowed to occur instantaneously, but instead, are "ramped", so that the changes are gradual and smooth. However, a given ramp rate on pump displacement will produce an acceleration inversely proportional to the gear ratio, such that, if it is desired to maintain the same rate of acceleration or deceleration after the shift as before, the ramp rate must be adjusted by the change in gear ratio. Thus, the logic, in operation block 309, decreases the ramp rate by the change in gear ratio during an up-shift, and increases the ramp rate by the change in gear ratio during a down-shift.

In addition, the operation block 309 will send appropriate signals 78 and 79 (both of which will be "OFF") to move the shift cylinder 37 to neutral. Finally, the operation block 309 will send an appropriate signal to the bypass valve 55 to move it from the closed position shown in FIG. 1 to an open position, such that there is open communication between the conduits 25 and 27, and the motor 29 is thereafter bypassed, or short-circuited. It should be noted that the operation block 309 deals with the situation wherein the transmission 33 is in gear, shifting to neutral. If the transmission were in neutral, and the vehicle were moving, the shift inhibit flag would have already been set in operation block 105 in FIG. 3, as part of the testing of the shift feasibility.

After either of the operation blocks 307 or 309, the system proceeds to a decision block 311 in which the logic determines if the shift cylinder 37 is in the desired position, i.e., if the signal 67 corresponds to the signals 75 and 77. If the outcome of the decision block 311 is "NO", the system proceeds to a decision block 313 which determines whether or not the actual shift time (i.e., the time to effect the desired shift), is greater than the maximum allowable shift time. Here the logic is looking at the expired time during the attempted shift to see if a shift fault has occurred. If the outcome of the decision block 313 is "NO", the system merely loops back and re-executes the decision block 311. If the outcome of the decision block 313 is "YES", the system proceeds to an operation block 315 in which the logic sets the shift fault light in a positive condition, then sets the shift cylinder 37 in whatever gear (i.e., first gear, or second gear, or neutral) constituted the "current gear" from which a shift was being commanded. Finally, the operation block 315 sets the displacement command equal to zero, which involves commanding the swashplate 43 to neutral, although those skilled in the art will understand that it is desirable to "ramp" this command signal to neutral, to avoid a sudden stopping of the vehicle. After the operation block 315, or if the outcome of the decision block 311 is "YES", the system proceeds to an operation block 319 which clears the shift pending flag, then the logic proceeds to an operation block 317 in which an appropriate signal is sent to the bypass valve 55 to close it, and again permit system pressure to build, and the pump displacement jog cycle is discontinued. After the operation block 317, the system proceeds to the automotive drive logic 400.

When the bypass valve 55 is originally opened, thus bypassing the motor 29, the result is to relieve torque on the output shaft 31. Within the scope of the present invention, several alternative arrangements may be utilized. If the transmission 33 includes a jaw clutch receiving the input torque from the shaft 31, it is necessary to actually "break" the torque, in order to permit shifting of the transmission 33. On the other hand, if the transmission 33 includes a friction type clutch receiving the input torque, it is sufficient to simply decrease the torque, in order to permit shifting of the transmission 33. Therefore, hereinafter, and in the appended claims, references to relieving torque will be understood to mean and include both breaking and decreasing the torque from the motor 29 to the transmission 33.

Figure 8:
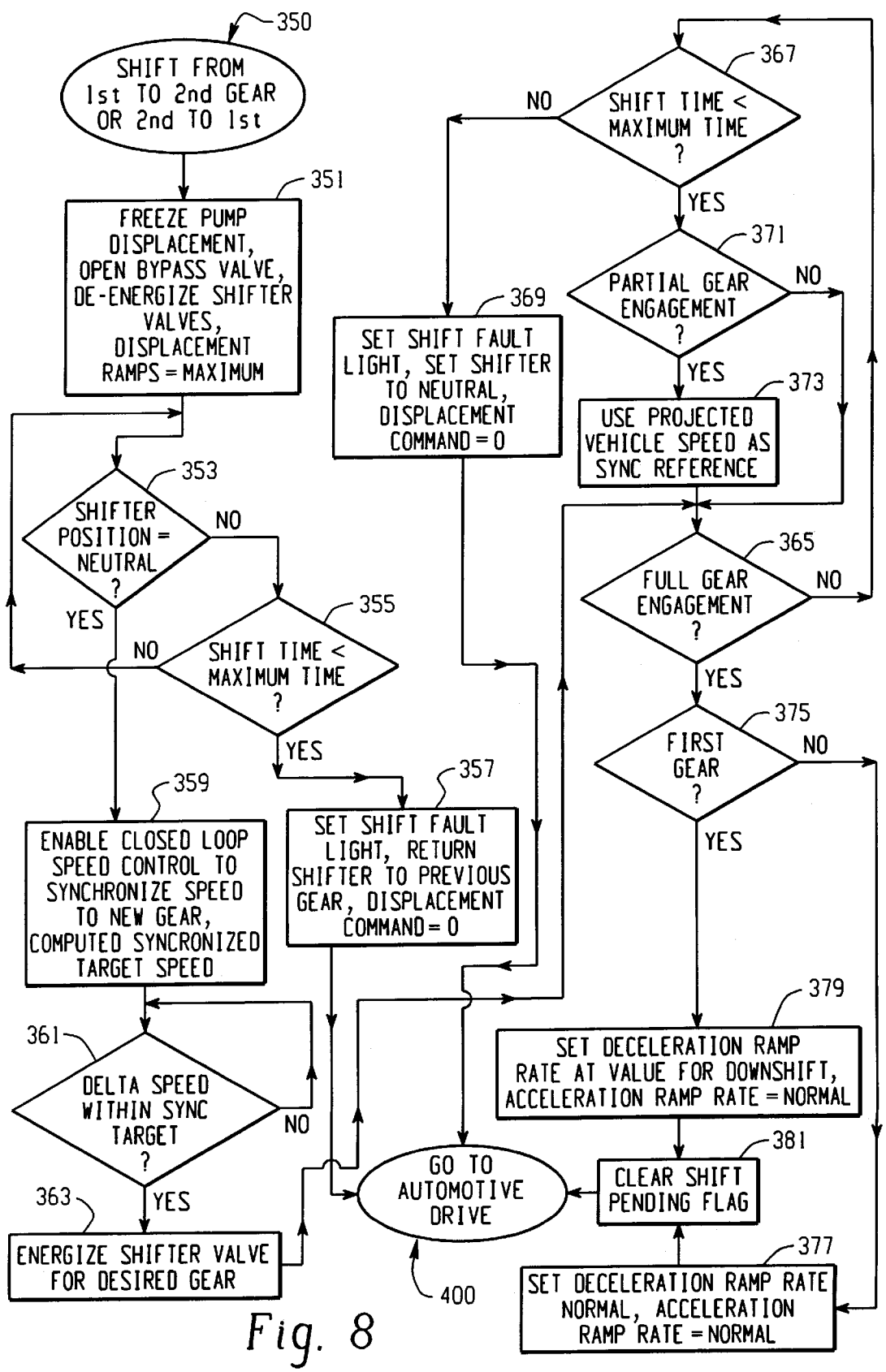
Figure 10:
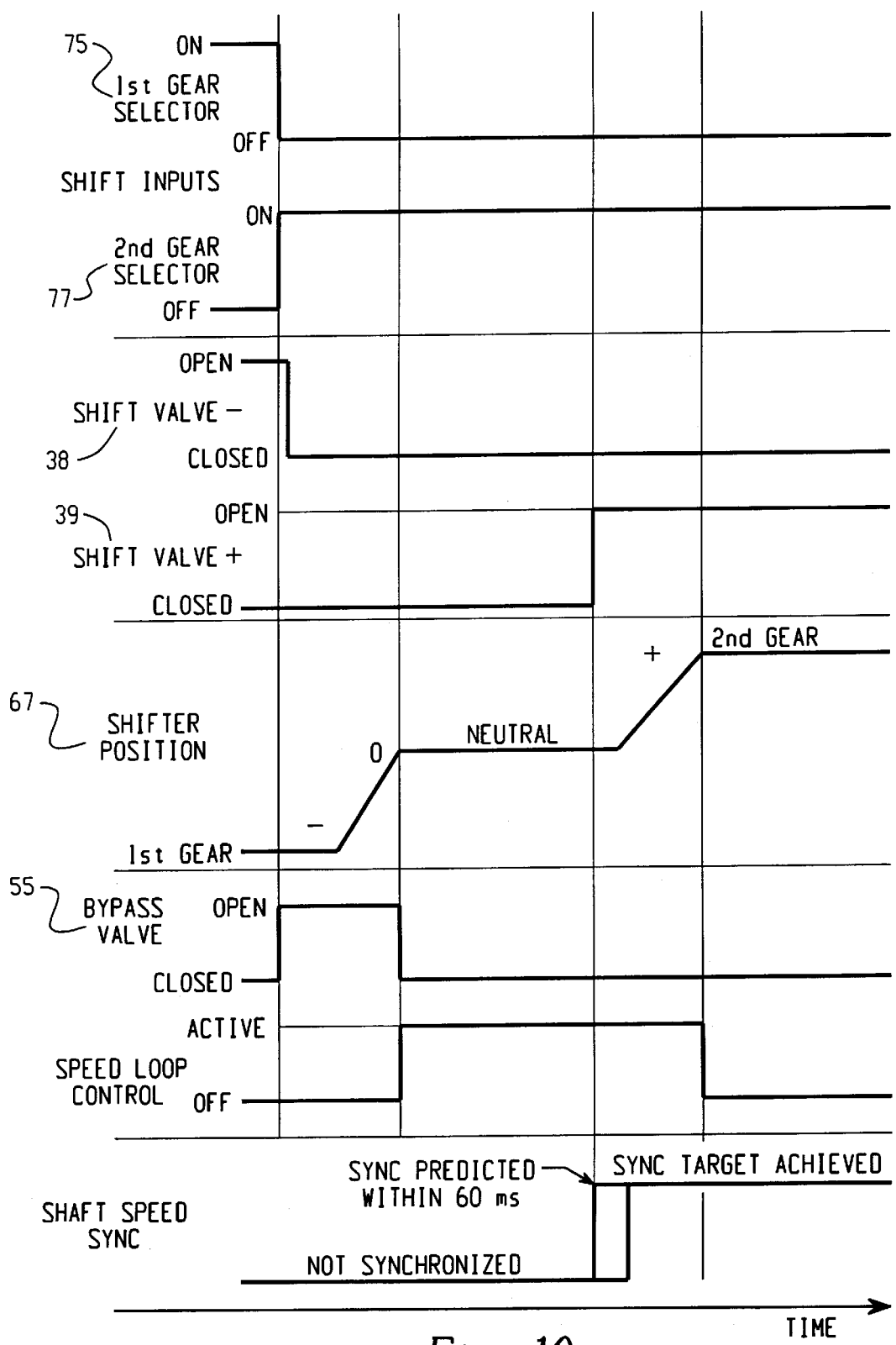
FIG. 10 is a graph of shift sequence, as a function of time, illustrating the various steps in a shift operation in accordance with the present invention.

Referring now primarily to FIG. 8, but also to the graph of FIG. 10, there is a description of the shift logic 350, which deals with shifting either from first gear to second gear or from second gear to first gear which, in either case, involves passing through the neutral condition of the transmission 33. It should be noted that FIG. 10 illustrates the various steps, as a function of time, in shifting from first gear (Gear 1) to second gear (Gear 2). The logic 350 starts with an operation block 351 in which the logic will send appropriate driver signals 81 and 83 to the servo control valves 47 and 49, respectively to maintain the position of the servo assembly 45, and therefore of the pump swashplate 43, thus keeping the displacement of the pump fixed. At the same time, the logic will send the appropriate signal to the bypass valve 55 to move it from the closed position shown in FIG. 1 to the open position (see FIG. 10), described previously. Also in the operation block 351, appropriate signals 78 and 79 are sent to the shift valves 38 and 39, respectively, whereby the valves are spring biased to the position shown in FIG. 1, draining both chambers of the shift cylinder 37 to tank. In addition, the displacement ramps of the pump are set at their maximum, i.e., the ramps are set to allow the fastest possible displacement of the swashplate 43.

After the operation block 351, the logic proceeds to a decision block 353 which interrogates the shift cylinder position signal 67 to determine whether or not it is in neutral. If not ("NO"), the logic proceeds to a decision block 355 which determines whether or not the actual shift time is greater than the maximum allowable shift time, as was done in the decision block 313 in FIG. 7. If the outcome of the decision block 355 is "NO", the system merely loops back and re-executes the decision block 353. If the outcome of the decision block 355 is "YES", the system proceeds to an operation block 357 in which the logic sets the shift fault light in a positive condition, then sets the shift cylinder 37 in whatever gear constituted the previous gear, i.e., the gear that the transmission was already (and is still) in. Finally, the operation block 357 sets the displacement command equal to zero, in the same manner as was done in the operation block 315 of FIG. 7, with the change in displacement again being moderated by a ramp. After the operation block 357, the system proceeds to the automotive drive logic 400.

If the outcome of the decision block 353 is "YES", indicating that the shift cylinder 37 is in neutral, the system proceeds to an operation block 359 in which the system drives the motor 29 to a speed which will result in the output shaft 31 rotating at such a speed that the selected gear in the transmission 33 will be driven at a speed which is nearly the same as the then-current speed of the drive shaft 35 of the transmission 33 (see Speed Loop Control in FIG 10). A fixed, or predetermined, speed offset is maintained between the output shaft 35 and the transmission gear to be engaged, in order to promote gear mesh, as is generally well known to those skilled in the art. The operation block 359 also includes the step of computing the "sync" (synchronized) target speed, to be explained below.

It is one important aspect of the invention to minimize the interruption of the torque which drives the vehicle, or stated another way, to minimize the shift time so that there is less chance of the vehicle operator being unable to complete a shift, or having a prospective shift be considered not feasible. In order to minimize wasted time, the shift valves 38 and 39 are actuated, or sent the driver signals 78 and 79, respectively, in advance ("predictively") of the desired action of the valves by a period of time equal to the known "reaction time" of the valves. For example, if it takes about 30 ms to energize the desired shift valve 38 or 39, and another 30 ms for the shift cylinder 37 to engage the gears, the logic of the present invention will begin to energize the valve about 60 ms prior to achieving the speed synchronizing target. In order to implement this feature, the logic establishes an artificial speed target which is lower than target speed (when speed is being increased), or higher than target speed (when speed is being decreased). The appropriate driver signal 78 or 79 is transmitted when this artificial target speed has been achieved. In determining the artificial target speed, the logic will consider the amount the speed of the motor 29 will change in the next 60 ms, and the amount the speed of the drive shaft 35 will change in the next 60 ms.

After the operation block 359, the system proceeds to a decision block 361 which determines whether or not the speed difference between the two parts of the jaw clutch to be engaged is within the sync target. If the outcome of the decision block is "NO", the system merely loops back and repeats decision block 361 until the outcome is "YES", at which point the logic proceeds to an operation block 363. In the operation block 363, the system sends an appropriate driver signal 78 or 79 to whichever of the shift valves 38 or 39, respectively, must be actuated in order to move the shift cylinder 37 to a position corresponding to the desired gear of the transmission 33.

After the completion of the operation block 363, the logic proceeds to a decision block 365 in which there is a determination of whether or not full gear engagement has occurred. Within the transmission 33, the occurrence of a full gear engagement is determined by a shift potentiometer, or by interrogating the shift cylinder position signal 67. If the outcome of the decision block is "NO", the system proceeds to a decision block 367, which determines whether or not the actual shift time is less than the maximum allowable shift time. If the outcome is "NO", the system proceeds to an operation block 369 in which the logic sets the shift fault light in a positive condition, then sets the shift cylinder 37 in its neutral position, and then sets the pump displacement command equal to zero. After the operation block 369, the system proceeds directly to the automotive drive logic 400.

If the outcome of the decision block 367 is "YES", the system then proceeds to a decision block 371 which determines whether or not a partial gear engagement has occurred. If the outcome is "NO", the system proceeds back to the decision block 365. If, however, the outcome of the decision block 371 is "YES", the system proceeds to an operation block 373 in which the previously computed synchronized target speed is replaced with the projected vehicle speed. With a partial gear engagement having occurred, the output shaft 31 and the drive shaft 35 are locked together through the transmission gearing, and it is impossible to maintain the commanded speed differential ("sync target speed") between the two. When this occurs, it is necessary to open the speed loop, otherwise the pump will be commanded either to increase motor speed to the maximum, or to reduce motor speed to the minimum, in an effort to maintain the desired speed difference. If the shift cylinder position signal 67 indicates a partial gear engagement has occurred, the logic replaces actual speed of the drive shaft 35 with a speed projected from the vehicle speed history during the shift. This projected vehicle speed serves as the speed reference until full engagement of the gears is detected, in connection with decision block 365. This portion of the logic eliminates the need to know the exact moment of gear mesh and avoids speed "run-away" of the transmission, as that term is understood by those skilled in the art.

From the operation block 373, the system proceeds again to the decision block 365, and whenever the outcome of the decision block 365 is finally "YES", the system proceeds to a decision block 375 which determines if the transmission 33 is in first gear. If the outcome of the decision block 375 is "NO", the system proceeds to an operations block 377, in which the deceleration and acceleration ramp rates are both set to normal. After the completion of the operation block 377, the system proceeds to an operation block 381 which clears the shift pending flag, after which the logic proceeds to the automotive drive logic 400.

If the outcome of the decision block 375 is "YES", indicating that the transmission is in first gear, then the system proceeds to an operation block 379 in which the deceleration ramp rate is set, temporarily, at a value appropriate for a down shift, while the acceleration ramp rate is set at normal. The purpose of this step is to moderate what would otherwise be a rather abrupt deceleration if the operator has backed off of the ground speed set signal 73. After the operation block 379, the system proceeds to the operation block 381 which clears the shift pending flag, then the system proceeds to the automotive drive logic 400.

Figure 9:
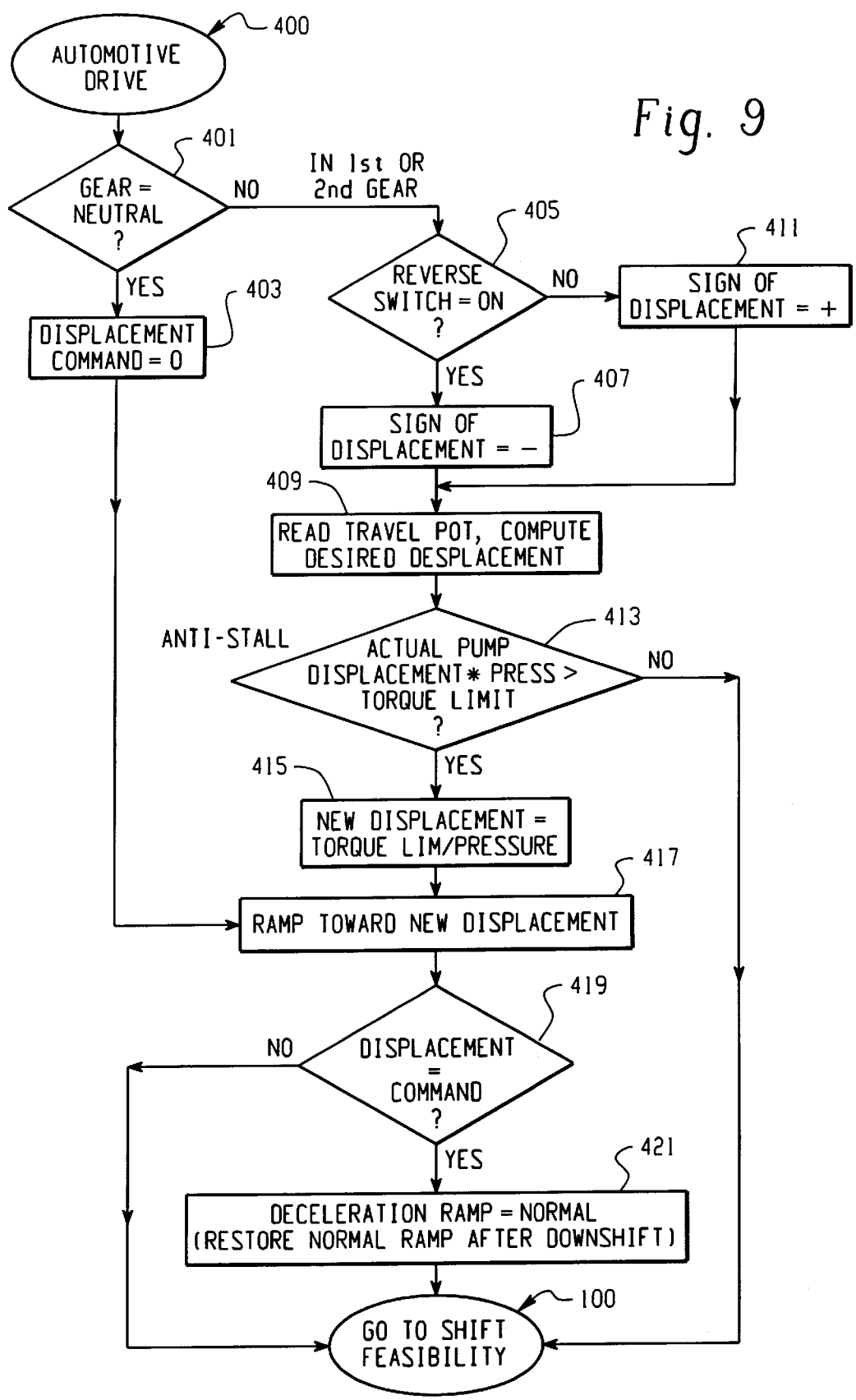

Referring now primarily to FIG. 9, the automotive drive logic 400 will be described. The logic 400 starts with a decision block 401 which, by interrogating the position signal 67, determines if the transmission 33 is in neutral. If so ("YES"), the logic proceeds to an operation block 403 in which the pump displacement command is set at zero. After the operation block 403, the system proceeds directly to an operation block 417, which will be described further subsequently.

If the outcome of the decision block 401 is "NO", indicating that the transmission is in either first gear or second gear, the system proceeds to a decision block 405 which determines if the F/N/R signal 71 indicates operation in reverse. If the outcome of the decision block 405 is "YES", the system proceeds to an operation block 407 in which the sign of pump displacement is set equal to a negative value, after which the system proceeds to an operation block 409. If the outcome of the decision block 405 is "NO", the system proceeds to an operation block 411 in which the sign of the pump displacement is set equal to a positive value, after which the system proceeds to the operation block 409. In the operation block 409, the system reads the travel pot (ground speed set signal 73), then computes the desired pump displacement needed to achieve the commanded ground speed, then the logic proceeds to a decision block 413, which involves "anti-stall" capability. The decision block 413 determines whether or not actual pump displacement multiplied by the system pressure will exceed the predetermined torque limit. If the outcome of the decision block 413 is "NO", the system loops back to the shift feasibility logic 100. If the outcome of the decision block 413 is "YES", the system proceeds to an operation block 415 in which the system calculates a new pump displacement, which is the predetermined torque limit divided by the current system pressure, i.e., the pressure in whichever of the conduits 25 or 27 is at the higher pressure. The system then proceeds to the operation block 417, in which the pump displacement is varied, moving along the predetermined ramp toward the new displacement calculated in the operation block 415.

After the operation block 417, the system proceeds to a decision block 419 in which it is determined whether or not the new pump displacement is equal to the commanded pump displacement. If the outcome of the decision block 419 is "NO", the system proceeds directly to the shift feasibility logic 100. If the outcome is "YES", the system proceeds to an operation block 421 in which the deceleration ramp is set to normal, i.e., after a downshift it is desirable to restore the normal ramp. After the operation block 421, the system proceeds to the shift feasibility logic 100.

It will be understood by those skilled in the vehicle propel and vehicle control arts that, although certain types of shift feasibility have been discussed hereinabove, the invention is not so limited, and various other tests of shift feasibility will occur to those skilled in the art. It is intended to include such other tests of shift feasibility within the general scope of the invention.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A method of shifting a transmission of a vehicle including a source of motive power, and at least one drive wheel; said transmission receiving input torque from said source of motive power, and to transmit output torque to said drive wheel; said transmission including a variable displacement hydraulic pump, fluid pressure actuated means for varying the displacement of said pump, and a hydraulic motor hydraulically coupled to said pump, said transmission further including a mechanical transmission having a first gear ratio and a second gear ratio, and fluid pressure actuated means for shifting said mechanical transmission from a neutral condition to one of said first gear ratio and said second gear ratio conditions; the method comprising the steps of:

(a) when said mechanical transmission is in said first gear ratio, relieving said output torque transmitted by said hydraulic motor;

(b) shifting said mechanical transmission from said first gear ratio to said neutral condition;

(c) controlling fluid pressure at said fluid actuated means for varying the displacement of said pump, to synchronize the output speed of said hydraulic motor with the instantaneous input speed required for said mechanical transmission to operate in said second gear ratio; and (d) controlling the fluid pressure at said fluid pressure actuated means for shifting said mechanical transmission whereby said transmission is shifted into said second gear ratio.

2. A method of shifting a transmission as claimed in claim 1, characterized by the additional step, prior to step (d), of determining the feasibility of the prospective shift to said second gear ratio and if said prospective shift is determined not to be feasible, preventing the prospective shift to said second gear ratio.

3. A method of shifting a transmission as claimed in claim 2, characterized by said step of determining the feasibility of the prospective shift includes the steps of determining if said transmission is being shifted from said neutral condition, and if the vehicle is moving, and when both conditions are met, inhibiting the prospective shift.

4. A method of shifting a transmission as claimed in claim 2, characterized by said step of determining the feasibility of the prospective shift includes the steps of determining if said transmission is in one of said first gear ratio and said second gear ratio conditions, and if system torque is above a predetermined minimum, and when both conditions are met, inhibiting the prospective shift.

5. A method of shifting a transmission as claimed in claim 2, characterized by said step of determining the feasibility of the prospective shift includes the step of determining if a predicted transmission output speed change during the prospective shift is less than a predetermined maximum permissible speed change, and if the condition is not met, inhibiting the prospective shift.

6. A method of shifting a transmission as claimed in claim 2, characterized by said step of determining the feasibility of the prospective shift includes the steps of determining the prospective displacement of the pump after the prospective shift, comparing the prospective pump displacement to predetermined pump displacement limits, and if said prospective pump displacement is outside said limits, inhibiting the prospective shift.

7. A method of shifting a transmission as claimed in claim 6, characterized by said step of determining the feasibility of the prospective shift includes the step of determining the existence of an overrunning load, and if the condition is met, adjusting said predetermined pump displacement limits to compensate for said overrunning load.

8. A method of shifting a transmission as claimed in claim 2, characterized by said step of determining the feasibility of the prospective shift includes the step of determining the prospective pressure after the prospective shift, comparing the prospective pressure to a predetermined maximum allowable pressure, and if the prospective pressure is above the allowable pressure, inhibiting the prospective shift.

9. A method of shifting a transmission as claimed in claim 2, characterized by said step of determining the feasibility of the prospective shift includes the step of determining the actual vehicle direction, comparing the actual vehicle direction to a commanded vehicle direction, and if the actual and commanded vehicle directions are not the same, inhibiting the prospective shift.

10. A method of shifting a transmission as claimed in claim 2, characterized by said step of determining the feasibility of the prospective shift includes the step of determining if a shift to or from neutral is commanded, and the step of determining if the vehicle is not moving, and if both conditions are met, initiating a pump displacement jog cycle to achieve gear engagement or disengagement within said mechanical transmission.

11. A method of shifting a transmission as claimed in claim 1, characterized by said step (c) includes the step of determining a synchronized target speed, and said step (d) includes the step of actuating an appropriate shift valve, said method further comprising, when the output speed of said hydraulic motor is at least equal to said synchronized target speed, predictively transmitting an appropriate actuation signal to said shift valve.

12. A method of shifting a transmission as claimed in claim 11, characterized by said step of determining the feasibility of the prospective shift includes the step of determining if a partial gear engagement has occurred, and if so, determining projected vehicle speed, and substituting projected vehicle speed for the synchronization target speed.

* * * * *